(12) United States Patent
Shin

(10) Patent No.: US 10,576,960 B2
(45) Date of Patent: Mar. 3, 2020

(54) APPARATUS AND METHOD FOR CALCULATING MAXIMUM OUTPUT TORQUE OF ENGINE OF HYBRID ELECTRIC VEHICLE

(71) Applicants: Hyundai Motor Company, Seoul (KR); Kia Motors Corporation, Seoul (KR)

(72) Inventor: Dong Jun Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 186 days.

(21) Appl. No.: 15/828,683

(22) Filed: Dec. 1, 2017

(65) Prior Publication Data
US 2018/0154883 A1 Jun. 7, 2018

(30) Foreign Application Priority Data

Dec. 2, 2016 (KR) .......................... 10-2016-0163460

(51) Int. Cl.
*B60W 20/10* (2016.01)
*B60W 10/06* (2006.01)
(Continued)

(52) U.S. Cl.
CPC ............... *B60W 20/10* (2013.01); *B60K 6/48* (2013.01); *B60W 10/06* (2013.01); *B60W 50/0098* (2013.01); *F02D 11/105* (2013.01); *F02D 41/2441* (2013.01); *F02D 41/2451* (2013.01); *B60K 2006/4825* (2013.01); *B60W 2050/0088* (2013.01); *B60W 2510/0638* (2013.01); *B60W 2510/0657* (2013.01);
(Continued)

(58) Field of Classification Search
CPC ... B60W 20/10; B60W 10/06; F02D 41/2451; F02D 2200/1002; F02D 2200/1006; Y10S 903/903; B60Y 2200/92
See application file for complete search history.

(56) References Cited

U.S. PATENT DOCUMENTS

2011/0190969 A1 8/2011 Amann et al.
2011/0276207 A1* 11/2011 Falkenstein ............ B60K 6/442
                                                     701/22

(Continued)

FOREIGN PATENT DOCUMENTS

JP          3336279 B2    10/2002
KR   10-2013-0088206 A    8/2013
KR   10-2015-0075628 A    7/2015

*Primary Examiner* — Abby Y Lin
*Assistant Examiner* — Martin A Weeks
(74) *Attorney, Agent, or Firm* — Mintz Levin Cohn Ferris Glovsky and Popeo, P.C.; Peter F. Corless

(57) ABSTRACT

An apparatus for calculating a maximum output torque of an engine of a hybrid electric vehicle includes a torque deviation calculating unit configured to calculate a torque deviation by using a currently output engine torque and an engine command torque, an engine output change learning unit configured to learn the torque deviation when a torque deviation learning start condition of the hybrid electric vehicle is satisfied, and an engine part load maximum torque calculating unit configured to calculate an engine part load maximum output torque based on the learned torque deviation so as to control an output of the engine.

17 Claims, 6 Drawing Sheets

(51) Int. Cl.
*B60K 6/48* (2007.10)
*F02D 41/24* (2006.01)
*F02D 11/10* (2006.01)
*B60W 50/00* (2006.01)

(52) U.S. Cl.
CPC . *B60W 2510/0676* (2013.01); *B60W 2550/12* (2013.01); *B60Y 2200/92* (2013.01); *F02D 2200/021* (2013.01); *F02D 2200/101* (2013.01); *F02D 2200/1002* (2013.01); *F02D 2200/1006* (2013.01); *F02D 2250/18* (2013.01); *Y10S 903/903* (2013.01)

(56) References Cited

U.S. PATENT DOCUMENTS

2013/0253749 A1* 9/2013 Hayashi ................. B60K 6/445
 701/22
2015/0197234 A1* 7/2015 Liang ..................... B60L 15/20
 701/22

* cited by examiner

APPARATUS AND METHOD FOR CALCULATING MAXIMUM OUTPUT TORQUE OF ENGINE OF HYBRID ELECTRIC VEHICLE

CROSS-REFERENCE TO RELATED APPLICATION

This application claims under 35 U.S.C. § 119(a) the benefit of Korean Patent Application No. 10-2016-0163460, filed on Dec. 2, 2016 in the Korean Intellectual Property Office, the entire contents of which are incorporated by reference herein.

BACKGROUND

(a) Technical Field

The present disclosure relates to an apparatus and method for calculating a maximum output torque of an engine of a hybrid electric vehicle, and more particularly to a technique of accurately calculating a part load maximum output torque of an engine by recognizing an available engine output.

(b) Description of the Related Art

In general, a hybrid electric vehicle includes an engine and a driving motor as power sources, and the motor supports an output of the engine through assistance of driving power and is charged when the driving power is insufficient.

The modes of the hybrid electric vehicle are classified into a part load and a full load according to degrees of loads when the hybrid electric vehicle is driven. Due to the control characteristics of an engine, there is a torque (an engine part load maximum output torque) that may be maximally output in the case of a part load, and if a torque that is not less than the engine part load maximum output torque is required, the air fuel ratio is controlled to be rich, for example, the amount of the fuel is increased by about 30% as compared with the theoretical air fuel ratio of lambda=1 and the hybrid electric vehicle starts a full load mode that is a maximum output mode.

In the full load mode of the engine, a maximum performance of the engine is pursued and thus the efficiency of the engine is abruptly lowered and fuel consumption is rapidly increased.

Accordingly, because a hybrid control unit (I-ICU) that is an uppermost level controller must accurately recognize an available output of the engine to efficiently control the vehicle when determining a part load or a full load in consideration of the current vehicle driving situation, it is necessary to accurately recognize the available output of the engine.

SUMMARY

The present disclosure provides an apparatus and a method for calculating a maximum output torque of an engine of a hybrid vehicle, by which deterioration of driving and fuel ratio due to a difference between engine part load maximum output torques of a hybrid control unit (HCU) and an engine management system (EMS) may be prevented, and a transition time point to a full load mode may be accurately determined and controlled.

In accordance with an aspect of the present disclosure, there is provided an apparatus for calculating a maximum output torque of an engine of a hybrid electric vehicle, the apparatus including a torque deviation calculating unit configured to calculate a torque deviation by using a currently output engine torque and an engine command torque, an engine output change learning unit configured to learn the torque deviation when a torque deviation learning start condition of the hybrid electric vehicle is satisfied, and an engine part load maximum torque calculating unit configured to calculate an engine part load maximum output torque based on the learned torque deviation so as to control an output of the engine.

According to an embodiment, the apparatus may further include a full load mode start determining unit configured to determine whether a full load mode has started based on the engine part load maximum output torque and a motor discharge restricting torque.

According to an embodiment, the apparatus may further include a motor discharging restricting torque calculating unit configured to calculate the motor discharge restricting torque.

According to an embodiment, the torque deviation may be an absolute value that is obtained by dividing the currently output engine torque by the engine command torque.

According to an embodiment, the engine output change learning unit may store an average shift value of the torque deviation as a torque deviation learning value by determining that the learning start condition is satisfied when at least one of a temperature of cooling water of the engine, an RPM of the engine, a torque of the engine, an engine lambda, or a torque deviation satisfy a predetermined condition.

According to an embodiment, the engine part load maximum output torque calculating unit may calculate the engine part load maximum output torque by using a maximum output torque of the engine, a torque loss value of the engine, a suctioned air temperature/atmospheric pressure compensating factor, a real-time engine torque loss value, and the torque deviation learning value.

According to an embodiment, the engine part load maximum output torque calculating unit may calculate the engine part load maximum output torque by obtaining a fast value by multiplying a value obtained by adding the engine maximum output torque and the engine torque loss value and the suctioned air temperature/atmospheric pressure compensating factor, by obtaining a second value by multiplying the multiplication result value and the engine part load maximum output torque calculating factor, by obtaining a third value by subtracting the real-time engine torque loss value from the second value, and by obtaining a fourth value by multiplying the third value and the torque deviation learning value.

According to an embodiment, the full load mode start determining unit may calculate a driver required torque, and determines the start of the full load mode by comparing the driver required torque with an value obtained by adding the engine part load maximum output torque and the motor discharge restricting torque.

According to an embodiment, the full load mode start determining unit may determine that the hybrid electric vehicle starts the full load mode if the driver required torque is more than a value obtained by adding the engine part load maximum output torque and the motor discharge restricting torque.

In accordance with another aspect of the present disclosure, there is provided a method for calculating a maximum output torque of an engine of a hybrid electric vehicle, the apparatus including learning, by a controller, a torque deviation if a torque deviation learning start condition is satisfied when the hybrid electric vehicle is driven; calculating, by the controller, an engine part load maximum output torque based on the learned torque deviation; and determining, by the controller, whether a full load mode has started based on the engine part load maximum output torque and a motor discharge restricting torque so as to control an output of the engine.

According to an embodiment, the learning of the torque deviation may include storing an average shift value of the torque deviation as a torque deviation learning value by determining that the learning start condition is satisfied when at least one of a temperature of cooling water of the engine, an RPM of the engine, a torque of the engine, an engine lambda, or a torque deviation satisfy a predetermined condition.

According to an embodiment, the torque deviation may be a value obtained by dividing a currently output engine torque by an engine command torque.

According to an embodiment, the calculating of the engine part load maximum output torque may include calculating the engine part load maximum output torque by using a maximum output torque of the engine, a torque loss value of the engine, a suctioned air temperature/atmospheric pressure compensating factor, a real-time engine torque loss value, and the torque deviation learning value.

According to an embodiment, the calculating of the engine part load maximum output torque may include calculating the engine part load maximum output torque by obtaining a first value by multiplying a value obtained by adding the engine maximum output torque and the engine torque loss value and the suctioned air temperature/atmospheric pressure compensating factor, by obtaining a second value by multiplying the multiplication result value and the engine part load maximum output torque calculating factor, by obtaining a third value by subtracting the real-time engine torque loss value from the second value, and by obtaining a fourth value by multiplying the third value and the torque deviation learning value.

According to an embodiment, the determining of whether the vehicle starts the full load mode may include calculating a driver required torque, calculating a motor discharge restricting torque, and comparing the driver required torque with a value obtained by adding the engine part load maximum output torque and the motor discharge restricting torque.

According to an embodiment, the determining of whether the vehicle starts the full load mode may include determining that the hybrid electric vehicle starts the full load mode if the driver required torque is more than a value obtained by adding the engine part load maximum output torque and the motor discharge restricting torque.

In accordance with another aspect of the present disclosure, there is provided a non-transitory computer readable medium containing program instructions executed by a processor, the computer readable medium including: program instructions that learn a torque deviation if a torque deviation learning start condition is satisfied when a hybrid electric vehicle is driven; program instructions that calculate an engine part load maximum output torque based on the learned torque deviation; and program instructions that determine whether a full load mode has started based on the engine part load maximum output torque and a motor discharge restricting torque so as to control an output of the engine.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
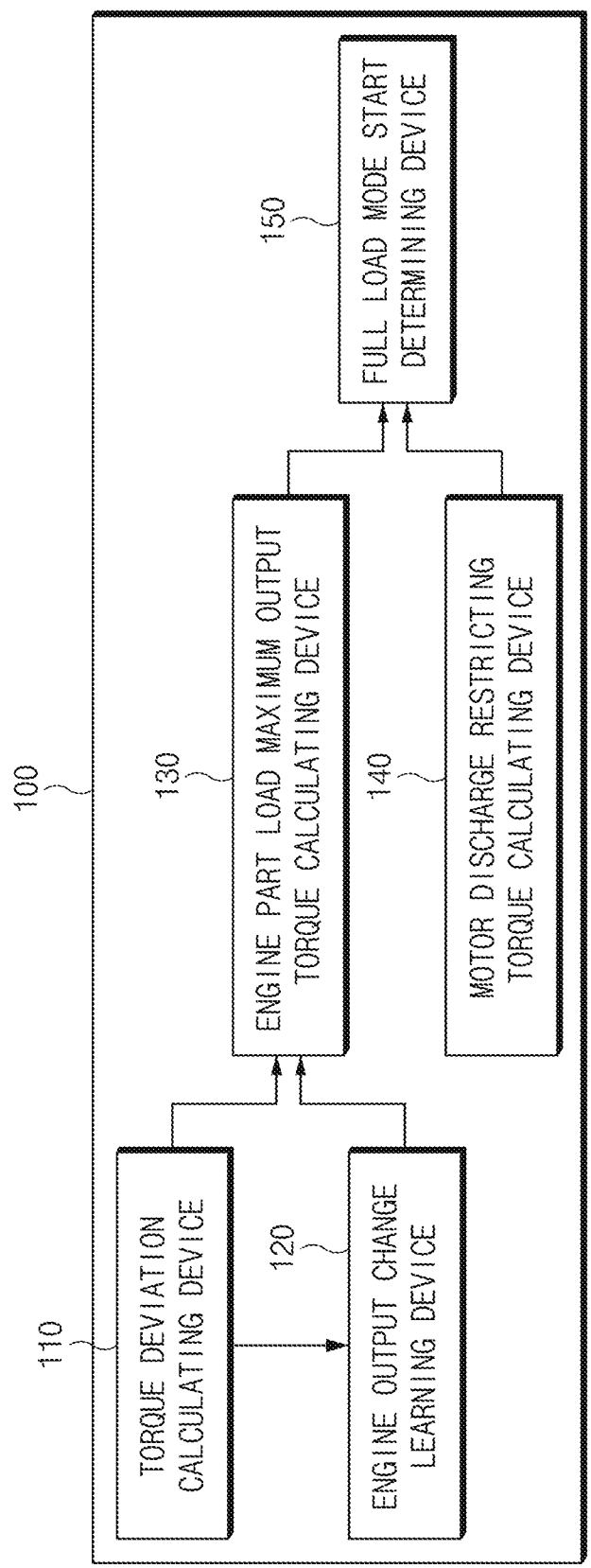
FIG. 1 is a block diagram of an apparatus for calculating a maximum output torque of an engine of a hybrid electric vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, exemplary embodiments of the present disclosure will be described in detail with reference to FIGS. 1 to 6.

FIG. 1 is a block diagram of an apparatus 100 for calculating a maximum output torque of an engine of a hybrid electric vehicle according to an embodiment of the present disclosure.

The apparatus 100 for calculating a maximum output torque of an engine of a hybrid electric vehicle according to an embodiment of the present disclosure compensates and calculates an engine part load maximum output torque by learning a change of an output of the engine in an actual driving situation of the hybrid electric vehicle. Here, the part load maximum output torque of the engine refers to a maximum output torque that may be output while the air fuel ratio λ of the engine is maintained at 1. That is, the part load maximum output torque of the engine is an element that is necessary to determine whether the hybrid electric vehicle is driven in a full load mode or a part load mode according to a driving situation. Then, the apparatus for calculating a maximum output torque of an engine of a hybrid electric vehicle according to an embodiment of the present disclosure may be replaced by a hybrid control unit (HCU) of the hybrid electric vehicle. The HCU is an uppermost level controller that controls setting of a hybrid operation mode and an overall operation of a hybrid electric vehicle and is connected to other devices such as an engine management system (EMS) through a high speed CAN communication line to execute a cooperative control while transmitting and receiving information.

To achieve this, the apparatus for calculating a maximum output torque of an engine of a hybrid electric vehicle according to an embodiment of the present disclosure includes a torque deviation calculating unit 110, an engine output change learning unit 120, an engine part load maximum output torque calculating unit 130, a motor discharge restricting torque calculating unit 140, and a full load mode start determination unit 150.

The torque deviation calculating unit 110 calculates a torque deviation as in Equation 1 by using a currently output engine torque and an engine command torque.

$$\text{Torque deviation} = \left| \frac{\text{Currently output engine torque}}{\text{Engine command torque}} \right| \quad \text{[Equation 1]}$$

That is, the torque deviation is an absolute value of a value obtained by dividing a currently output engine torque by an engine command torque. Then, the currently output engine torque is a value that is always monitored by the EMS, and the torque deviation calculating unit 110 receives the currently output engine torque from the EMS through CAN communication. Further, the engine command torque is a value that is determined in consideration of various factors in the HCU.

The engine output change learning unit 120 learns a torque deviation when a torque deviation learning starts condition of a vehicle is satisfied. That is, the engine output change learning unit 120 calculates an average shift value of a torque deviation and stores the average shift value as a learning value when the torque deviation learning start condition of the vehicle is satisfied.

Then, the torque deviation learning start condition of the vehicle is as in Equation 2.

Learning start condition=(Temperature of cooling water of engine>Condition 1) and (Condition 2<RPM of engine<Condition 3) and (Condition 4<Torque of engine<Condition 5) and (Condition 6<Average λ<Condition 7) and (Torque deviation<Condition 8)  [Equation 2]

Then, the RPM of the engine, the temperature of cooling water, the average lambda value of the engine is a value that is always monitored by the EMS and is acquired through the CAN communication. Further, the average lambda value refers to a lambda value that is filtered via a low-pass filter.

The engine part load maximum output torque calculating unit 130 calculates a part load maximum output torque of the engine as in Equation 3 based on the torque deviation that has been learned by the engine output change learning unit 120.

Engine part load maximum output torque=[(Maximum output torque of engine+Torque loss value of engine)*Suctioned air temperature·atmospheric pressure compensating factor*Engine part load maximum output torque calculating factor]−Real-time engine torque loss value*|Torque deviation learning value|  [Equation 3]

Figure 2:
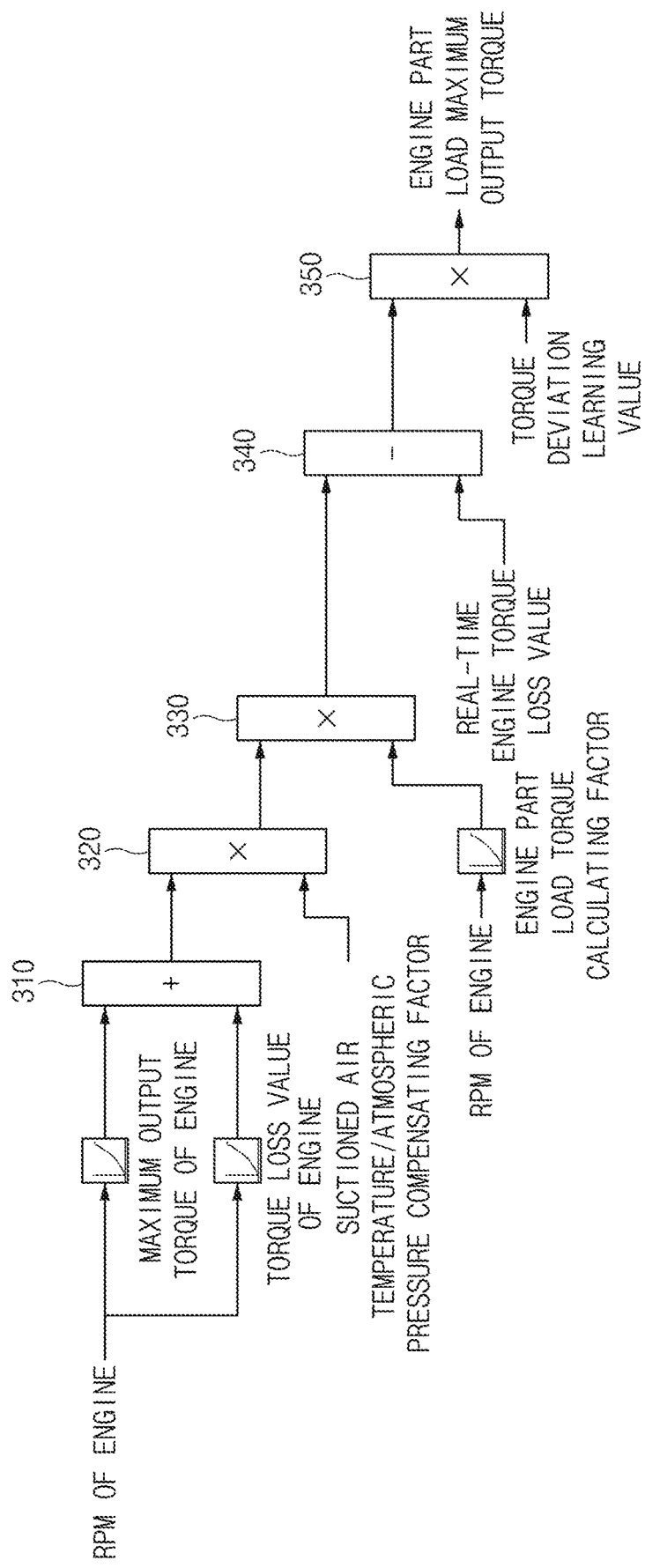
FIG. 2 is a schematic diagram of a method for calculating a part load maximum output torque of an engine of a hybrid electric vehicle according to an embodiment of the present disclosure.

Referring to FIG. 2, the engine part load maximum output torque calculating unit 130 acquires an engine maximum output torque and an engine torque loss value from the RPM of the engine, and adds a maximum output torque of the engine and a torque loss value of the engine in an adder 310.

Thereafter, a multiplier 320 multiplies an output value of the adder 310 and a suctioned air temperature/atmospheric pressure compensating factor, and a multiplier 330 after the multiplier 320 multiplies an output value of the multiplier 310 and a part load torque calculating factor of the engine.

A subtracter 340 after the multiplier 330 subtracts a real time engine torque loss value from an output value of the multiplier 330, and a multiplier 350 after the subtracter 340 multiplies an output value of the subtracter 340 and a torque deviation learning value and outputs a part load maximum output torque of the engine.

Then, the engine torque loss value is a one-dimensional mapping value measured through an engine test in a standard state and may differ from an actual engine torque loss value according to an actual travel environment (a load of the engine, a temperature of suctioned air, a type of the fuel, an atmospheric pressure, and a bed-in of the engine).

Accordingly, the engine part load maximum output torque determined by the HCU may be different from the engine part load maximum output torque determined by the actual engine, that is, the EMS. In this case, because the actual EMS cannot perform a part load control to pursue the command torque of the HCU in a situation in which the HCU transmits the engine part load maximum output torque command to control the vehicle to the part load mode, the hybrid electric vehicle may start the full load mode, causing a situation of giving up the theoretical air fuel ratio and deteriorating the fuel ratio to an unnecessary fuel weight.

That is, when the HCU transmits the engine torque command without accurately recognizing an engine part load maximum output torque that may be actually output by the engine, the EMS fails to pursue the actual driver requited torque (=an engine torque+a motor torque), and may unintentionally cause a situation in which the air fuel ratio is controlled to be rich to allow the EMS to pursue the part load maximum output torque command of the HCU engine.

Accordingly, the engine part load maximum output torque calculating unit 130 of the present disclosure may calculate and learn a torque deviation and reflect a torque deviation learning value to calculate an engine part load maximum output torque, solving a difference between the engine part load maximum output torque of the HCU and the EMS.

The motor discharge restricting torque calculating unit 140 calculates a motor discharge restricting torque in consideration of a battery discharge power restricting value, a temperature of a battery, a state of charge (SOC), a charging/discharging strategy of the battery, an operation mode (an EV mode and a HEV mode), a power consumption of an air conditioner, a low voltage converter (LDC) full load power consumption, a margin for controlling an anti-jerk, and the like.

The full load mode start determining unit 150 determines whether the hybrid electric vehicle starts a full load mode based on an engine part load maximum output torque and a motor discharge restricting torque. That is, as in Equation 4, the hybrid electric vehicle starts a full load mode when a sum of the engine part load maximum output torque and the motor discharge restricting torque is less than a driver required torque. Then, the driver required torque is calculated through factors input to the HCH, and the motor discharge restricting torque is calculated through a mapping value measured through an engine test or by the motor discharge restricting torque calculating unit 140.

Driver required torque>(Engine part load maximum output torque+motor discharge restricting torque) [Equation 4]

Figure 3:
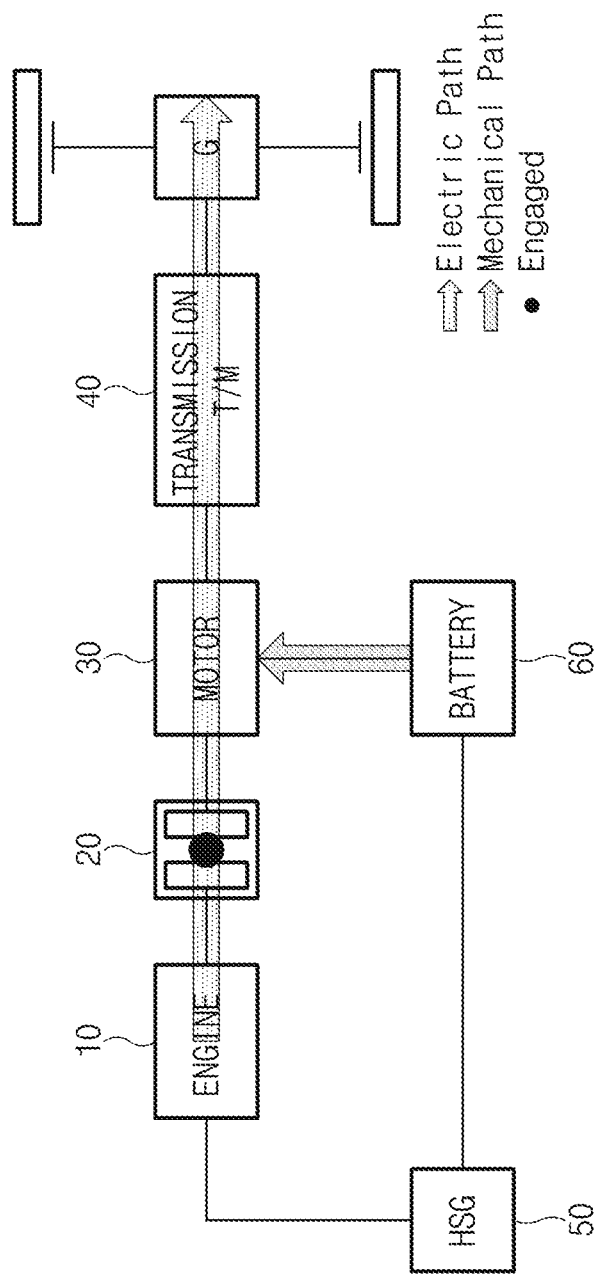
FIG. 3 is a schematic diagram of a hybrid electric vehicle, to which the apparatus for calculating a maximum output torque of an engine of a hybrid electric vehicle according to an embodiment of the present disclosure is applied.

FIG. 3 is a schematic diagram of a hybrid electric vehicle, to which the apparatus for calculating a maximum output torque of an engine of a hybrid electric vehicle according to an embodiment of the present disclosure is applied.

The hybrid system to which the embodiment of the present disclosure is applied includes an engine 10, an engine clutch 20, a motor 30, a transmission 40, a hybrid starter/generator (HSG) 50, and a battery 60.

The engine part load maximum output torque output from the engine part load maximum output torque calculating apparatus 100 of FIG. 1 is used to drive an output of the engine 10. The engine 10 is the power of the hybrid electric vehicle, and a mutter 30 functions to assist an output of the engine through assist if driving power is necessary.

The HSG 50 is operated as a motor to start the engine 10, or is operated as a generator to charge the battery 60 when a marginal output is generated while the engine 10 maintains a start-on state.

The battery 60 supplies electric power to the motor 30 to assist an output of the engine in an REV mode and charges a voltage generated through a recovery brake control.

The hybrid system including the above-mentioned components is generally well known to those skilled in the art, and thus a detained description thereof will be omitted.

Figure 4:
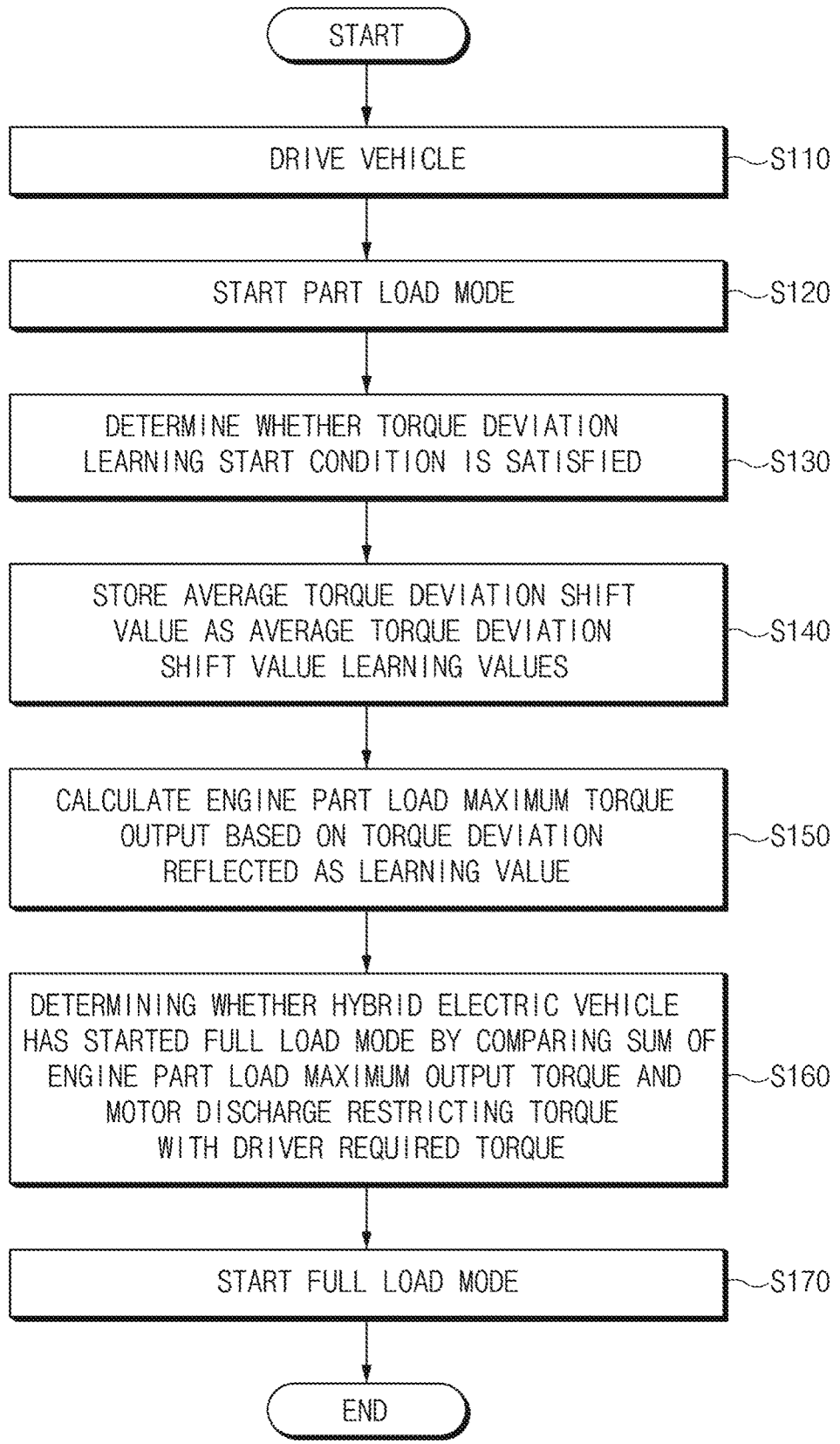
FIG. 4 is a flowchart illustrating a method for calculating a part load maximum output torque of an engine of a hybrid electric vehicle according to an embodiment of the present disclosure.

Hereinafter, a method for calculating a part load maximum output torque of an engine of a hybrid electric vehicle according to an embodiment of the present disclosure will be described in detail with reference to FIG. 4.

When the vehicle travels (S110), in the part load mode (S120), the engine part load maximum output torque calculating apparatus 100 of the hybrid electric vehicle calculates a torque deviation, and determines whether a torque deviation learning condition is satisfied (S130). In particular, the torque deviation is calculated as an absolute value of a value obtained by dividing a currently output engine torque by an engine command torque. Further, the torque deviation learning condition includes a temperature of cooling water of the engine, an RPM of the engine, a torque of the engine, a lambda of the engine, and a torque deviation, and it is determined that the learning start condition is satisfied when the conditions satisfy predetermined conditions. When the learning start condition is satisfied in this way, an average torque deviation shift value is calculated and is stored as a torque deviation learning value (S140).

Thereafter, the engine part load maximum output torque calculating apparatus 100 calculates an engine part load maximum output torque based on the learned torque deviation (S150).

Then, the engine part load maximum output torque calculating unit 100 calculates the engine part load maximum output torque by obtaining a first value by multiplying a value obtained by adding the engine maximum output torque and the engine torque loss value and the suctioned air temperature/atmospheric pressure compensating factor, by obtaining a second value by multiplying the first value and the engine part load maximum output torque calculating factor, by obtaining a third value by subtracting the real-time engine torque loss value from the second value, and by obtaining a fourth value by multiplying the third value and the torque deviation learning value.

Subsequently, the full load mode start determining unit 100 determines whether the hybrid electric vehicle starts a full load mode based on an engine part load maximum output torque and a motor discharge restricting torque (S160). That is, the engine part load maximum output torque calculating apparatus 100 compares a driver required torque with the value obtained by adding the engine part load maximum output torque and the motor discharge restricting torque, which has been calculated in S150, and determines that the hybrid electric vehicle starts a full load mode if the driver required torque is more than a value obtained by adding the engine part load maximum output torque and the motor discharge restricting torque.

In this way, if it is determined that the hybrid electric vehicle starts the full load mode, the engine part load maximum output torque calculating apparatus 100 starts the full load mode.

Figure 5:
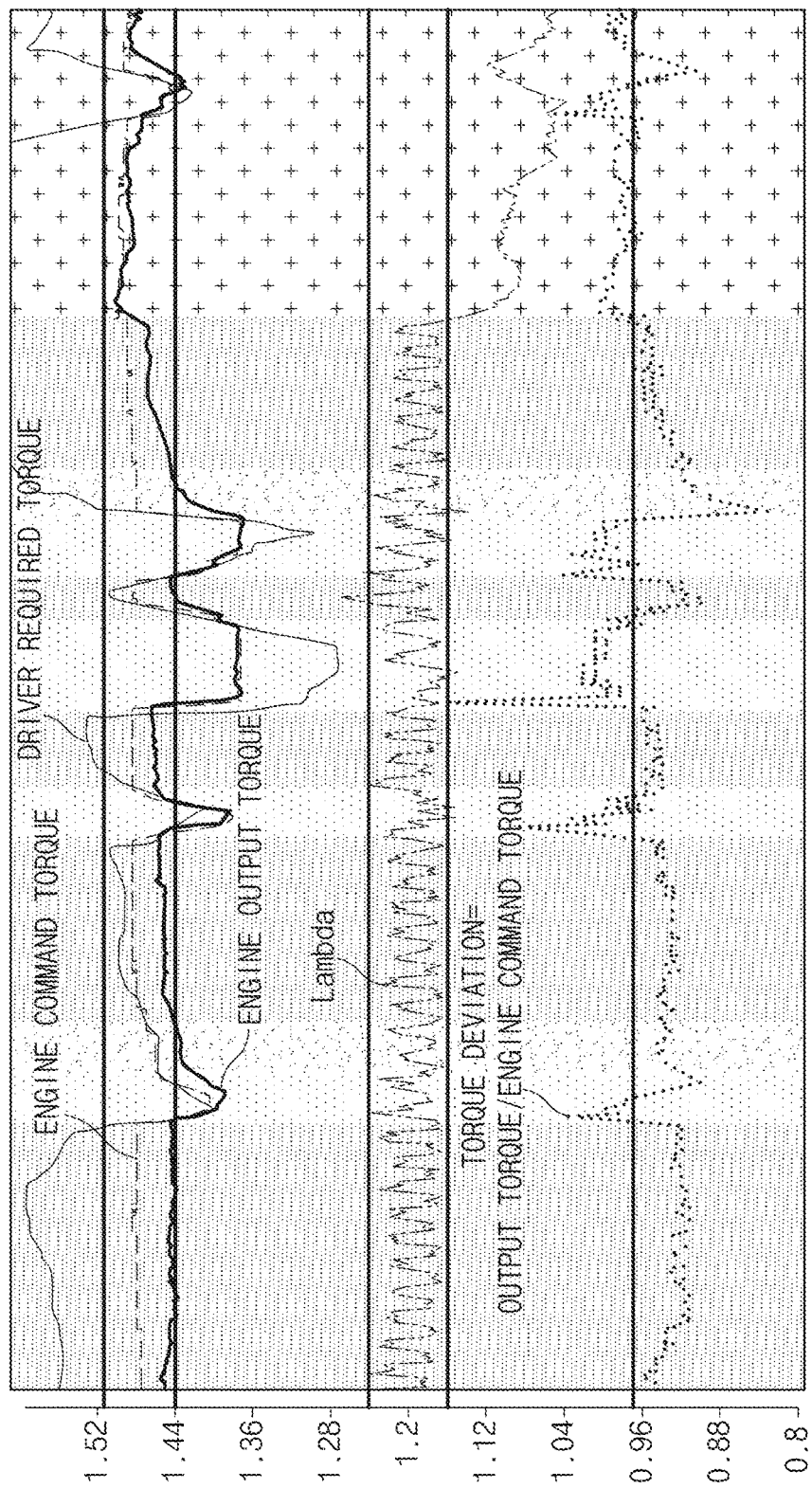
FIG. 5 is a graph for explaining whether a learning condition is satisfied according to an embodiment of the present disclosure.

FIG. 5 is a graph for explaining whether a learning condition is satisfied according to an embodiment of the present disclosure. Referring to FIG. 5, in this example, if the engine torque is more than condition 4 and less than condition 5, the average lambda of the engine is between condition 6 and condition 7, and if the torque deviation is less than condition 8, the learning start condition is satisfied.

In this way, according to the present disclosure, deterioration of fuel ratio caused by deterioration of a driving efficiency due to a difference between the engine part load maximum output torques of the HCU and the EMS or deterioration of fuel ratio due to unnecessary use of fuels may be prevented by learning an output change of the engine and applying the learned output change of the engine to calculation of the torque deviation learning value engine part load maximum output torque, and control reliability may be increased by accurately determining a transition time to a full load mode in a part load mode of the HCU control mode. The engine part load maximum output torque calculating technique as described herein may be utilized with all hybrid electric vehicle models and plug-in hybrid electric vehicles.

Figure 6:
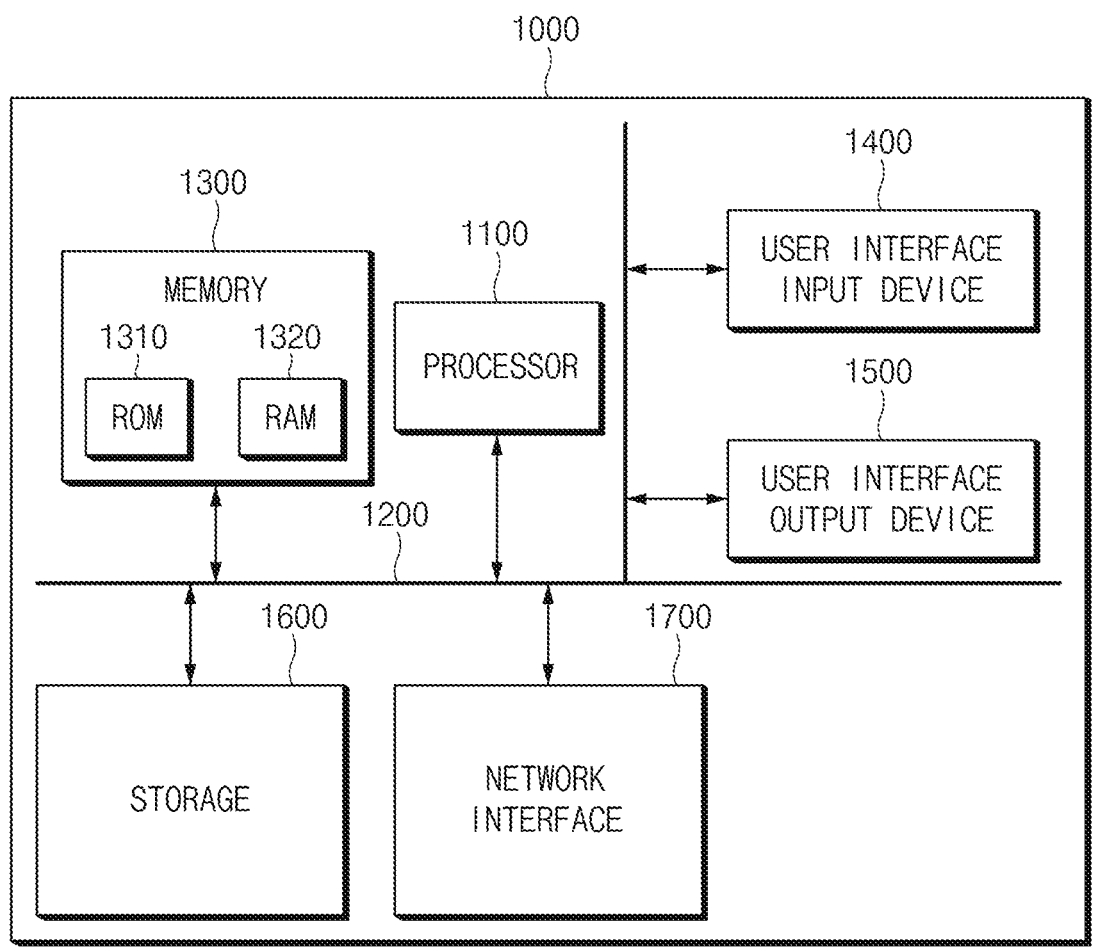
FIG. 6 is a block diagram of a computer system, to which the method for calculating a part load maximum output torque of an engine of a hybrid electric vehicle according to an embodiment of the present disclosure is applied.

FIG. 6 is a block diagram of a computer system, to which the method for calculating a part load maximum output torque of an engine of a hybrid electric vehicle according to an embodiment of the present disclosure is applied.

Referring to FIG. 6, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method of the present disclosure may prevent deterioration of driving and fuel ratio due to a difference between the engine part load maximum output torques of a hybrid control unit (HCU) and an engine management system (EMS) and may accurately determine and control a transition time point to a full load mode.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for calculating a maximum output torque of an engine of a hybrid electric vehicle, the apparatus comprising:
   a processor; and
   a non-transitory storage medium containing program instructions that, when executed by the processor, causes the apparatus to:
   calculate a torque deviation by using a currently output engine torque and an engine command torque;
   learn the torque deviation when a torque deviation learning start condition of the hybrid electric vehicle is satisfied; and
   calculate an engine part load maximum output torque based on the learned torque deviation so as to control an output of the engine.

2. The apparatus of claim 1, wherein the processor further causes the apparatus to:
   a full load mode start determining unit configured to determine whether a full load mode has started based on the engine part load maximum output torque and a motor discharge restricting torque.

3. The apparatus of claim 2, wherein the processor further causes the apparatus to:
   a motor discharging restricting torque calculating unit configured to calculate the motor discharge restricting torque.

4. The apparatus of claim 1, wherein the torque deviation is an absolute value that is obtained by dividing the currently output engine torque by the engine command torque.

5. The apparatus of claim 1, wherein the processor causes the apparatus to store an average shift value of the torque deviation as a torque deviation learning value by determining that the learning start condition is satisfied when at least one of a temperature of cooling water of the engine, an RPM of the engine, a torque of the engine, an engine lambda, or a torque deviation satisfy a predetermined condition.

6. The apparatus of claim 5, wherein the processor causes the apparatus to calculate the engine part load maximum output torque by using a maximum output torque of the engine, a torque loss value of the engine, a suctioned air temperature/atmospheric pressure compensating factor, a real-time engine torque loss value, and the torque deviation learning value.

7. The apparatus of claim 5, wherein the processor causes the apparatus to calculate the engine part load maximum output torque by obtaining a first value by multiplying a value obtained by adding the engine maximum output torque and the engine torque loss value and the suctioned air temperature/atmospheric pressure compensating factor, by obtaining a second value by multiplying the first value and the engine part load maximum output torque calculating factor, by obtaining a third value by subtracting the real-time engine torque loss value from the second value, and by obtaining a fourth value by multiplying the third value and the torque deviation learning value.

8. The apparatus of claim 2, wherein the processor causes the apparatus to calculate a driver required torque, and determines the start of the full load mode by comparing the driver required torque with an value obtained by adding the engine part load maximum output torque and the motor discharge restricting torque.

9. The apparatus of claim 8, wherein the processor causes the apparatus to determine that the hybrid electric vehicle starts the full load mode if the driver required torque is more than a value obtained by adding the engine part load maximum output torque and the motor discharge restricting torque.

10. A method for calculating a maximum output torque of an engine of a hybrid electric vehicle, the method comprising:
  learning, by a controller, a torque deviation if a torque deviation learning start condition is satisfied when the hybrid electric vehicle is driven;
  calculating, by the controller, an engine part load maximum output torque based on the learned torque deviation; and
  determining, by the controller, whether a full load mode has started based on the engine part load maximum output torque and a motor discharge restricting torque so as to control an output of the engine.

11. The method of claim 10, wherein the learning of the torque deviation includes: storing an average shift value of the torque deviation as a torque deviation learning value by determining that the learning start condition is satisfied when at least one of a temperature of cooling water of the engine, an RPM of the engine, a torque of the engine, an engine lambda, or a torque deviation satisfy a predetermined condition.

12. The method of claim 11, wherein the torque deviation is a value obtained by dividing a currently output engine torque by an engine command torque.

13. The method of claim 11, wherein the calculating of the engine part load maximum output torque includes: calculating the engine part load maximum output torque by using a maximum output torque of the engine, a torque loss value of the engine, a suctioned air temperature/atmospheric pressure compensating factor, a real-time engine torque loss value, and the torque deviation learning value.

14. The apparatus method of claim 11, wherein the calculating of the engine part load maximum output torque includes: calculating the engine part load maximum output torque by obtaining a first value by multiplying a value obtained by adding the engine maximum output torque and the engine torque loss value and the suctioned air temperature/atmospheric pressure compensating factor, by obtaining a second value by multiplying the multiplication result value and the engine part load maximum output torque calculating factor, by obtaining a third value by subtracting the real-time engine torque loss value from the second value, and by obtaining a fourth value by multiplying the third value and the torque deviation learning value.

15. The method of claim 10, wherein the determining of whether the vehicle starts the full load mode includes: calculating a driver required torque; calculating a motor discharge restricting torque; and comparing the driver required torque with a value obtained by adding the engine part load maximum output torque and the motor discharge restricting torque.

16. The method of claim 15, wherein the determining of whether the vehicle starts the full load mode includes:
  determining that the hybrid electric vehicle starts the full load mode if the driver required torque is more than a value obtained by adding the engine part load maximum output torque and the motor discharge restricting torque.

17. A non-transitory computer readable medium containing program instructions executed by a processor, the computer readable medium comprising:
  program instructions that learn a torque deviation if a torque deviation learning start condition is satisfied when a hybrid electric vehicle is driven;
  program instructions that calculate an engine part load maximum output torque based on the learned torque deviation; and
  program instructions that determine whether a full load mode has started based on the engine part load maximum output torque and a motor discharge restricting torque so as to control an output of the engine.

* * * * *